United States Patent [19]

Longo et al.

[11] 3,820,851
[45] June 28, 1974

[54] WHEEL ADAPTOR

[75] Inventors: Isadore S. Longo, San Gabriel; James J. Watson, Cerritos, both of Calif.

[73] Assignees: CP Auto Products; Rocket Racing Products, Los Angeles, Calif. ; part interest to each

[22] Filed: May 2, 1973

[21] Appl. No.: 356,280

[52] U.S. Cl................... 301/9 DN, 85/9 R, 301/36 R
[51] Int. Cl.............................................. B60b 3/14
[58] Field of Search.......... 301/9 DN, 36 R; 85/9 R

[56] References Cited
UNITED STATES PATENTS

| | | | |
|---|---|---|---|
| 2,970,008 | 1/1961 | Leach | 301/9 DN |
| 3,025,109 | 3/1962 | Martin | 301/9 DN |
| 3,329,468 | 7/1967 | Beith | 301/9 DN |
| 3,428,365 | 2/1969 | French | 301/9 DN |
| 3,459,455 | 8/1969 | Muench et al. | 301/9 DN |
| 3,779,610 | 12/1973 | Pansky | 301/9 DN |

Primary Examiner—M. Henson Wood, Jr.
Assistant Examiner—Victor N. Sakran
Attorney, Agent, or Firm—Herzig & Walsh

[57] ABSTRACT

A wheel adaptor for adapting a wheel to a hub where the wheel has a different diameter of bolt hole circles and the diameter of the stud bolt circle on the hub. The adaptor has a circle of holes in it whereby it may be bolted on to the hub. The adaptor has a second circular pattern of holes which are elongated and which have counterbores, there being a group of stud bolts having elongated heads and shanks extending from the heads in an offset position, the elongated heads being receivable in a counterbore in two different positions whereby the studs may be positioned along bolt circles of a plurality of diameters. A further set of stud bolts is provided wherein the shanks are not offset from the heads so that when these stud bolts are in position they provide a further diameter of the stud bolt circle. Preferably the shanks of the stud bolts are axially grooved to be able to be fitted tightly into the holes in the adaptor.

7 Claims, 9 Drawing Figures

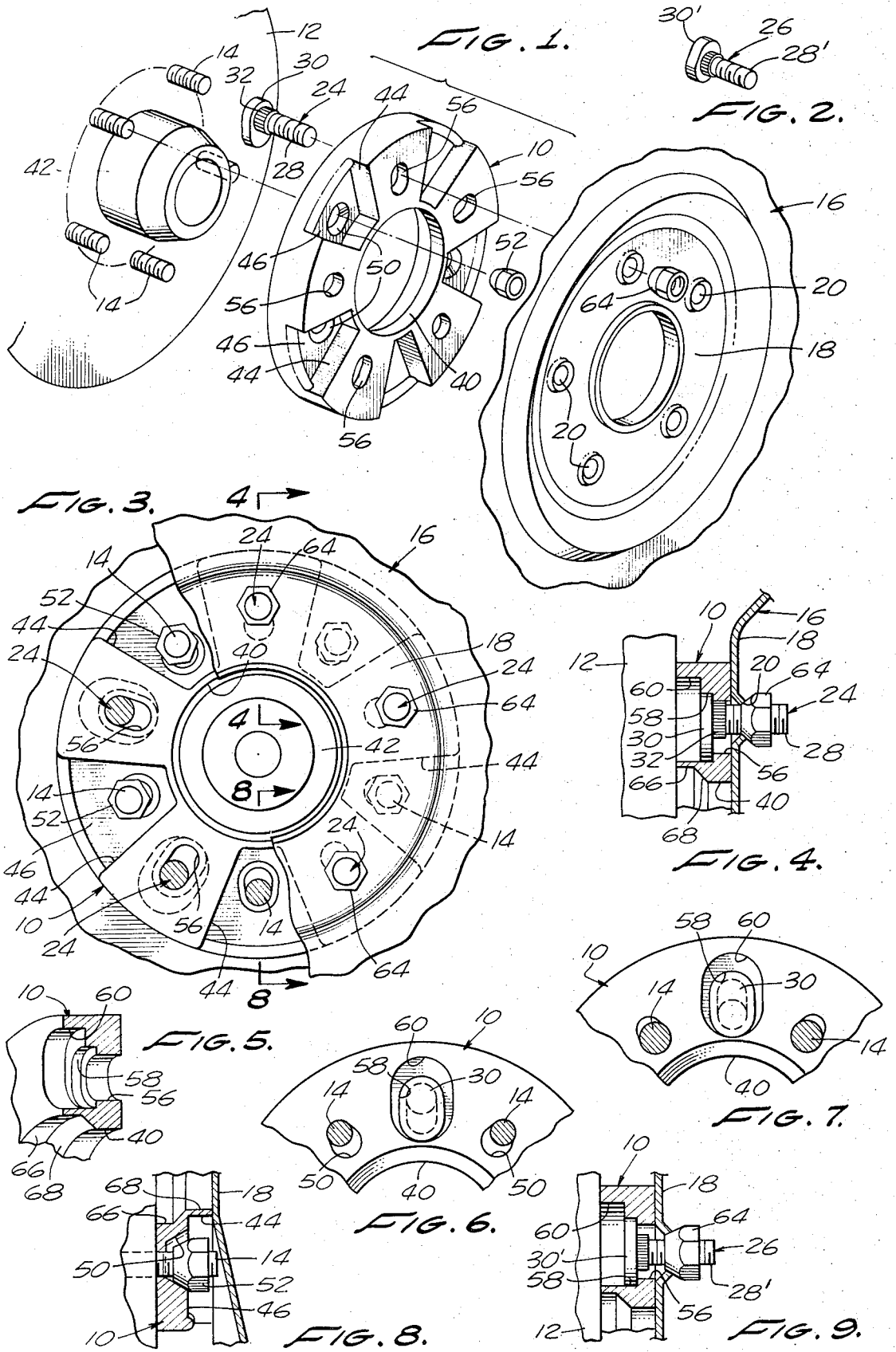

WHEEL ADAPTOR

SUMMARY OF THE INVENTION

The invention is an adaptor for purposes of adapting wheels, more particularly, automobile wheels having mounting holes along circles of different diameters to a hub or brake drum having a different diameter of circle of stud bolts.

In the preferred exemplary form of the invention as described herein, it is in the form of a circular member, preferably made of aluminum having a first pattern of holes in a circle adapting it to be bolted on to the hub at the end of the wheel axle. The adaptor has a second pattern or circle of holes which are elongated radially. These holes have counterbores similarly elongated for purposes which will be described. Associated with this pattern of holes is a group of stud bolts having elongated heads shaped to be received in the counterbores with their threaded shanks in an offset position with respect to the geometrical center of the head. The stud bolts can be fitted into the pattern of holes with elongated heads either in one of two positions to provide two different stud bolt diameters to adapt to bolt hole circles of different diameters. The holes of the first pattern are also preferably elongated radially.

Preferably, a different set of stud bolts is also provided wherein the shanks are symmetrically positioned to extend from the center of the elongated heads whereby the heads are positioned to accommodate the adaptor to a further diameter of bolt hole circle in the wheel.

A primary object of the invention is to provide extremely simple and inexpensive and easy to use means whereby to adapt wheels having different diameters of bolt hole circles to use with hubs or brake drums having diameters of stud bolt circles different from the diameters of the bolt hole circles in the wheel.

A further object is to provide such an adaptor adaptable for its purposes by way of radially elongated stud bolt circles having similarly elongated counterbores and stud bolts having similarly shaped elongated heads with shanks extending from the heads in an offset position whereby the stud bolts can be positioned in the adaptor in different positions, each of which accommodates a different diameter of stud bolt circle.

A further object is to provide shanks of the stud bolts with axial serrations so that they may be driven into the elongated holes to be tightly fitted therein.

BRIEF DESCRIPTION OF THE DRAWINGS

Further objects and additional advantages of the invention will become apparent from the following detailed description and annexed drawings, wherein:

FIG. 1 is a perspective view of a preferred form of the adaptor associated with a brake drum and wheel hub;

FIGS. 2 and 3 are detail views of preferred forms of stud bolts adapted for use with the adaptor;

FIG. 4 is a sectional view taken along line 4—4 of FIG. 3;

FIG. 5 is a detail perspective view of one of the elongated bores with elongated counterbores in the adaptor;

FIG. 6 is a partial detail view illustrating a stud bolt in one position in an elongated hole;

FIG. 7 is a detail view similar to that of FIG. 6 illustrating a stud bolt in an opposite position in an elongated hole;

FIG. 8 is a detail sectional view taken along the line 8—8 of FIG. 3; and

FIG. 9 is a sectional view similar to that of FIG. 4 showing the offset stud bolt in a different position.

DESCRIPTION OF THE PREFERRED EMBODIMENTS

Referring more particularly to the various figures of the drawings, the adaptor in the exemplary form shown at 10 is a ring shaped member, preferably fabricated of high grade prime aluminum to be used with plated, heat-treated bolts as will be described. FIG. 1 illustrates pictorially a hub or brake drum 12 having extending stud bolts 14, five of which are shown and which may typically be spaced along a circle of diameter of 4 ½ inches, 4 ¾ inches, 5 inches, or other amount. The interior part of a wheel 16 is shown having hub 18 with bolt holes 20 which may lie along a circle having a diameter corresponding to one of the diameters of the bolt circles just referred to.

Adaptor 10 is bolted to the hub or brake drum having bolts 14 which will be described, and hub 18 of wheel 16 is then bolted to adaptor 10. The wheel is bolted to the adaptor by way of stud bolts, one of which is shown at 24 and one at 26. Bolt 24 has a threaded part 28 and an elongated head 30. Adjacent head 30 is a shank which has a knurled or serrated part 32. The shank is offset towards one end of elongated head 30 as shown. Bolt 26 is like bolt 24, except that the shank is not offset from head 30' for purposes as will be described presently.

Adaptor 10 has a diameter approximately the size of hub 18 of the wheel. It has a center opening 40 of a size to accommodate extending hub 42 on the brake drum. Adaptor 10 in the form shown has five equally angularly spaced, trapezoidal countersinks, one of which is designated at 44. The sides of these countersinks lie along radii and thus diverge outwardly from the center. Countersink 44 has a bottom part 46. In each of the countersinks is a bolt hole, the one for countersink 44 is designated at 50, these bolt holes are the ones which receive stud bolts 14 for attaching the wheel adaptor by way of nuts, such as shown at 52.

FIG. 3 shows the adaptor bolted to the hub or brake drum and wheel 16 secured to the adaptor. The purpose of the adaptor is to adapt to wheels having bolt hole circles of different diameters, such as 4 ½ inches, 4 ¾ inches, 5 inches, as well as other bolt hole diameters.

Adaptor 10 has five elongated bolt holes through it, one of these being designated at 56. These holes are equally spaced between holes 50. Elongated hole or bore 56 can be seen in FIG. 4, there being correspondingly elongated counterbore 58 and a further elongated counterbore 60. Knurled part 32 of bolt 24 is of a diameter corresponding to the width of the elongated hole or bore 56. It can be tapped or driven into place with a hammer so that it is held against rotation in hole or opening 56. Head 30 fits into counterbore 58 as shown. It is of a size to fit into this counterbore. It can fit into this counterbore in either one of two positions, either with shank 28 in a radially outward position with respect to head 50 or in the opposite position, wherein shank 28 is radially inward with respect to head 30.

Thus, it may be seen that bolts 24 accommodate to two different diameters of bolt hole circles in hub 18 which would be bolt hole circles of 4 ½ inches radius and 5 inches radius. Five bolts like bolt 24 are provided and five more like bolt 26 shown in FIG. 2. Shank 28' of bolt 26 is not offset from head 30', but extends from the center part of the head, so when head 30' of bolt 26 is fitted into counterbore 58, shank 28' is an intermediate position, that is, one which accommodates to another diameter of bolt hole circle which in the example explained is the 4 ¾ inches diameter. Hub 18 of the wheel is secured to adaptor 10 by way of nuts 64.

FIG. 5 is a detail view, illustrating elongated hole or bore 56 and counterbores 58 and 60. It shows the opening or bore 40 in adaptor 10 which has an opening or bore 66 of a larger diameter on the rear side, these two bores being joined by slanting or bevelled bore 68. FIGS. 6 and 7 illustrate bolts 24 in the two different positions corresponding to positions as described to accommodate two different diameters of bolt hole circles.

FIG. 9 illustrates one of bolts 26 in position with shank 28' extending from head 30' without being offset to accommodate to an intermediate diameter of bolt hole circles, that is, of bolt hole circle diameter of 4 ¾ inches. FIG. 8 illustrates the attachment of the adaptor to the hub; preferably bolt holes 50 are slightly elongated along a radius to accommodate to varying diameters of stud bolt circles on hub 12.

The foregoing explains the nature of the invention, its construction and its mode of utilization which will be readily understood by those skilled in the art. It will be observed that a single adaptor will adapt to wheels of three different bolt hole diameters. This is accomplished by way of installation of bolts 30 in two different positions and use of bolts 26 for the intermediate diameter. Other adaptors may be provided for accomodating to other groups of bolt hole diameters. By elongating radially, the holes in the adaptor fit on to the studs on the brake drum, the adaptor accommodates to different diameters of stud bolt circles.

The foregoing disclosure is representative of a preferred form of the invention and is to be interpreted in an illustrative rather than a limiting sense, the invention to be accorded the full scope of the claims appended hereto.

What is claimed is:

1. An adaptor for adapting wheel hubs to wheels having bolt hole circles of different diameters, the adaptor comprising: a circular member having holes in a circle whereby the adaptor can be bolted to a hub, the adaptor having a second pattern of holes lying in a circle; and stud bolts adapted to be received in said second circle of holes, said second circle of holes and said stud bolts being configurated whereby said stud bolts can be positioned in the adaptor member at any one of a plurality of diameters of bolt circle.

2. An adaptor as in claim 1, wherein said second pattern of holes comprises holes which are elongated radially.

3. An adaptor as in claim 2, wherein said stud bolts have heads which are elongated radially with shanks which are offset with respect to the heads, whereby the heads can be positioned in the holes in different positions thereby to provide stud bolts in stud bolt circles of different diameters.

4. An adaptor as in claim 1, wherein said adaptor has angularly spaced recesses in it, said first holes being provided at the positions of said recesses.

5. An adaptor as in claim 3, wherein said stud bolts have serrations adjacent to the heads of a diameter such that the shanks of the stud bolts can be securely fitted in said elongated holes.

6. An adaptor as in claim 2, wherein each of said elongated holes has a bore and a counterbore, said stud bolts having heads which are elongated and shaped to fit into the elongated counterbores, said stud bolts having heads of elongated shape adapted to be received in said counterbores in a plurality of positions, said stud bolts having threaded shanks which are in an offset position relative to the heads whereby the stud bolt heads can be received in said counterbores in a plurality of positions thereby positioning the shanks in circles having a plurality of different diameters.

7. An adaptor as in claim 1, wherein said studs include a set of studs having elongated heads with shanks extending from the geometrical midpoint of the head whereby to accommodate a further diameter of stud bolt circles in the wheel.

* * * * *